United States Patent
Marutsuka

(10) Patent No.: US 6,777,087 B2
(45) Date of Patent: Aug. 17, 2004

(54) NEAR INFRARED-CUTTING MATERIAL AND PROCESS FOR PRODUCTION THEREOF

(75) Inventor: Toshinori Marutsuka, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 208 days.

(21) Appl. No.: 10/091,522

(22) Filed: Mar. 7, 2002

(65) Prior Publication Data
US 2002/0132122 A1 Sep. 19, 2002

(30) Foreign Application Priority Data

Mar. 14, 2001 (JP) ........................................ 2001-071747

(51) Int. Cl.$^7$ ................................................ B32B 9/04
(52) U.S. Cl. ................................ 428/411.1; 264/176.1; 359/350; 359/359; 428/343; 430/270.1; 528/196
(58) Field of Search ....................... 264/176.1; 359/350, 359/359; 430/270.1; 438/411.1; 528/196

(56) References Cited

U.S. PATENT DOCUMENTS 5,723,075 A    3/1998   Hayasaka et al. ........... 252/587
6,255,031 B1 *  7/2001   Yao et al. ................ 430/270.1

FOREIGN PATENT DOCUMENTS

EP    0 810 452 A2    12/1997
EP    0 934 985 A2    8/1999

OTHER PUBLICATIONS

Patent Abstracts of Japan, Publication No. 09–330612, Publication Date Dec. 22, 1997.
Dai, Z. et al.; "Synthesis and Characterization of Some Unsymmetric Substituted Bis(dithiobenzil)nickel Complex Dyes"; *Dyes and Pigments;* vol. 35, No. 1, pp. 23–29, 1997.

* cited by examiner

*Primary Examiner*—Terressa Boykin
(74) *Attorney, Agent, or Firm*—Kubovcik & Kubovcik

(57) ABSTRACT

A near infrared-cutting material produced by forming, on a transparent substrate, a transparent resin film containing at least a near infrared absorbing-dye and a dye having a maximum absorption wavelength at 550 to 620 nm, wherein the amount of the solvent remaining in the transparent resin film is 5 ppm by weight to less than 500 ppm by weight; since the amount of the solvent remaining in the transparent resin film containing a near infrared-absorbing dye, etc. is minimized, the long-term stability of the near infrared-absorbing dye, etc. in the film at high temperatures is greatly improved.

10 Claims, No Drawings

NEAR INFRARED-CUTTING MATERIAL AND PROCESS FOR PRODUCTION THEREOF

BACKGROUND OF THE INVENTION

1. Field of the Invention

The present invention relates to a near infrared-cutting material to be laminated or combined with an engineering material such as electromagnetic wave-shielding material, antireflection material or the like for use as a front filter of a display device such as plasma display panel (PDP) or the like; as well as to a process for producing such a near infrared-cutting material. More particularly, the present invention relates to a near infrared-cutting material wherein the amount of the solvent remaining in the resin film containing a near infrared-absorbing dye, etc. is minimized and thereby the long-term stability of the near infrared-absorbing dye, etc. in the resin film at high temperatures is greatly improved, and a process for producing such a near infrared-cutting material.

2. Description of the Prior Art

There are known, for example, (1) a near infrared-absorbing filter produced by laminating, on a substrate, a composition which is a dispersion of a near infrared-absorbing dye in a binder resin, wherein the amount of the solvent remaining in the laminate is 5.0% by weight or less, specifically 0.05 to 3.0% by weight (see JP-A-2000-227515); and (2) a near infrared-absorbing panel produced by laminating a near infrared-absorbing layer (obtained by dispersing a near infrared-absorbing dye in a transparent high-molecular resin and then subjecting the dispersion to melt extrusion) with an electromagnetic wave-shielding layer having a near infrared-shielding ability and/or an electromagnetic wave-shielding ability (see JP-A-9-330612).

However, the above filter and the above panel have problems. With respect to the near infrared-absorbing filter (1), it is known as described in the literature that when the amount of the residual solvent is controlled at less than 0.05% by weight, the deterioration of the near infrared-absorbing dye during the long-term storage at high temperature and high humidity is small but the heat applied to achieve such a solvent level (less than 0.05% by weight) tends to deteriorate the near infrared-absorbing dye. That is, in the molded material obtained by coating, on a substrate, a composition (which is a dispersion of a near infrared-absorbing dye in a binder resin) and drying the resulting material, the stability of the dye in the resin film formed on the substrate is higher as the solvent level in the resin film is lower and, therefore, it is desired to reduce the solvent level to a possible lowest value (less than 0.05% by weight); however, the drying of the coated composition at atmospheric pressure incurs striking thermal deterioration of the near infrared-absorbing dye.

Thus, in the near infrared-absorbing filter (1), since the reduction in near infrared-absorbability and change of hue are occurring in the resin film of the molded material owing to the thermal decomposition of the near infrared-absorbing dye, it is impossible to achieve a residual solvent level of less than 0.05% by weight by increasing the temperature for drying or extendIng the time for drying; further, it is impossible to use a dye of high near infrared-absorbability but of low thermal resistance, making narrow the range of dye selection.

In the near infrared-absorbing panel (2), the near infrared absorbing-dye undergoes striking thermal deterioration (decomposition) during the melt extrusion at atmospheric pressure, and this dye decomposition reduces the near infrared-absorbability of the panel and also changes its hue. Therefore, the merit of the panel that the dye stability is high owing to no solvent use unlike in the near infrared-absorbing filter (1), is not utilized.

Also in the near infrared-absorbing panel (2), uniform dispersion of the dye is not easy and the color and near infrared-absorbability of the panel tend to be non-uniform; moreover, since the melt extrusion at atmospheric pressure is conducted ordinarily at high temperatures such as 240° C. and the like, it is impossible to use a dye of high near infrared-absorbability but of low thermal resistance, making narrow the range of dye selection, as in the case of the near infrared-absorbing filter (1).

SUMMARY OF THE INVENTION

The present invention aims at providing (1) a near infrared-cutting material which has alleviated the above-mentioned problems of the prior art and wherein the amount of the solvent remaining in the resin film containing a near infrared-absorbing dye, etc. is minimized and thereby the long-term stability of the near infrared-absorbing dye, etc. in the resin film at high temperatures is greatly improved; and (2) a process for producing such a near infrared-cutting material.

The present invention provides:

a near infrared-cutting material produced by forming, on a transparent substrate, a transparent resin film containing at least a near infrared absorbing-dye and a dye having a maximum absorption wavelength at 550 to 620 nm, wherein the amount of the solvent remaining in the transparent resin film is 5 ppm by weight to less than 500 ppm by weight;

a near infrared-cutting material produced by forming, on a transparent substrate, a transparent resin film containing at least a near infrared absorbing-dye and a transparent resin adhesive layer containing at least a dye having a maximum absorption wavelength at 550 to 620 nm so that the transparent resin adhesive layer becomes the outermost layer, wherein the amount of the solvent remaining in the transparent resin film and/or the transparent resin adhesive layer is 5 ppm by weight to less than 500 ppm by weight; and a process for producing a near infrared-cutting material, which comprises coating, on a transparent substrate, a transparent resin solution containing at least a near infrared absorbing-dye and a dye having a maximum absorption wavelength at 550 to 620 nm, drying the resulting material at atmospheric pressure until the amount of the solvent remaining in the formed film becomes 3% by weight or less, and then drying the resulting material under reduced pressure until the amount of the solvent in the film becomes 5 ppm by weight to less than 500 ppm by weight.

DETAILED DESCRIPTION OF THE INVENTION

The present invention is described in detail below.

The transparent substrate used in the present invention has no particular restriction as to the kind, thickness, shape, etc. as long as it is transparent and has such heat resistance and mechanical strengths as to withstand the film formation steps of the present invention consisting of a coating step and a drying step. As the transparent substrate, there can be mentioned, for example, a glass sheet, a plastic film, a plastic sheet and a plastic plate; specifically, a reinforced glass sheet, a polyethylene terephthalate (PET) film, a polycarbonate (PC) film, a triacetyl cellulose (TAC) film, an acrylic resin sheet, a polycarbonate sheet, an olefin-maleimide (copolymer) type resin sheet and a norbornene resin sheet.

The resin for the transparent resin film used in the present invention has no particular restriction as to the kind, etc. as long as it is transparent and can disperse or dissolve dyes uniformly when it has been made into a resin solution or a resin film. As the resin, there can be mentioned, for example, a polycarbonate, a polyarylate, a polycarbodiimide, an epoxy resin, a polyvinyl acetal, an acrylic resin and a polyester. These resins can be used singly or in admixture of two or more kinds. There is no particular restriction, either, as to the form of the resin. The resin may be, for example, a powder, pellets, or other form.

The resin for the transparent resin adhesive layer used in the present invention has no particular restriction as to the kind, etc. as long as it has transparency and adhesivity and can disperse or dissolve dyes uniformly. As the resin, there can be mentioned, for example, a polycarbodiimide, an epoxy resin, a polyvinyl acetal, an acrylic resin and a polyester. These resins can be used singly or in admixture of two or more kinds. Of these, preferred are an acrylic resin, a polycarbodiimide, an epoxy resin, etc. There is no particular restriction, either, as to the form of the resin. The resin may be, for example, a powder, pellets, or other form.

In the present invention, various additives are added to the above-mentioned resin for transparent resin film and the above-mentioned resin for transparent resin adhesive layer to prepare a transparent resin solution. This transparent resin solution is coated on the above-mentioned transparent substrate to form a transparent resin film and a transparent resin adhesive layer.

As the additives, a near infrared-absorbing dye can be mentioned first. There is no particular restriction as to this near infrared-absorbing dye as long as it has a maximum absorption wavelength at 800 to 1,200 nm and is dispersible or soluble in the above-mentioned transparent resin solution, transparent resin film and transparent resin adhesive layer. As such a near infrared-absorbing dye, there can be mentioned, for example, dithiol-metal complex compounds, diimonium compounds, phthalocyanine compounds, naphthalocyanine compounds, azo compounds, polymethine compounds and anthraquinone compounds. These compounds can be used singly or in admixture of two or more kinds. Of them, preferred are dithiol-metal complex compounds and diimonium compounds; more preferred are a dithiol-metal complex compound represented by the following formula (1):

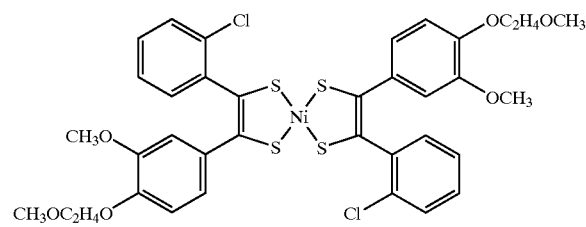

diimonium compounds represented by the following general formula (2):

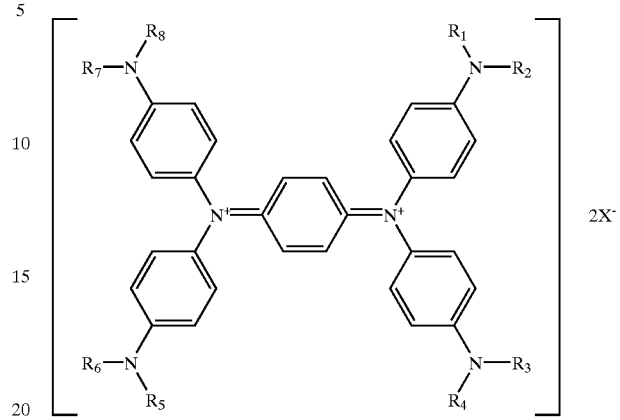

(wherein $R_1$ to $R_8$ may be the same or different and are each a hydrogen atom, an alkyl group, an aryl group, an alkoxy group, a phenoxy group or a hydroxyl group; and $X^-$ is an anion typified by halogen anion, perchloric acid anion, antimony hexafluoride anion or nitric acid anion), and dithiol-metal complex compounds represented by the following general formula (3):

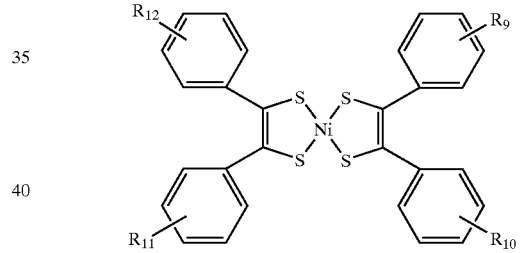

(wherein $R_9$ to $R_{12}$ may be the same or different and are each an alkylene group having 1 to 4 carbon atoms, an aryl group, an aralkyl group, an alkylamino group, an alkoxy group, a halogen atom or a hydrogen atom).

As the additives, a dye having a maximum absorption wavelength at 550 to 620 nm can be mentioned next. As to this dye, there is no particular restriction as long as it has a maximum absorption wavelength at 550 to 620 nm, that is, in an orange light region including a neon light and is dispersible or soluble uniformly in the above-mentioned transparent resin solution, transparent resin film and transparent resin adhesive layer. As such a dye, there can be mentioned, for example, cyanine compounds, squarylium compounds, azomethine compounds, xanthene compounds, oxonol compounds and azo compounds. Of them, preferred are cyanine compounds and more preferred is a cyanine compound represented by the following formula (4):

(4)

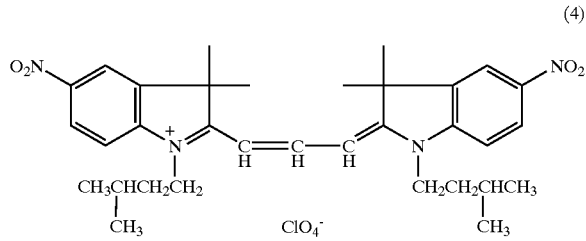

Other additives such as color-adjusting dye or pigment, ultraviolet-absorbing substance, crosslinking agent, antioxidant, polymerization retarder and the like may be added as necessary into the transparent resin solution, the transparent resin film and/or the transparent resin adhesive layer. The color-adjusting dye or pigment has no particular restriction as to the kind but is preferably a phthalocyanine compound, for example.

Further, organic or inorganic metal particles may be dispersed in the transparent resin solution, the transparent resin film and/or the transparent resin adhesive layer as long as the transparency of the solution, the film and/or the layer is not lost, in order to allow the transparent resin film and/or the transparent resin adhesive layer to show stress relaxation, controlled hardness, glare prevention, electroconductivity, etc.

The near infrared-cutting material of the present invention has a main function of near infrared-cutting. It is generally preferred that, when the near infrared-cutting material is produced in few kinds and each in a large amount, the transparent resin film is allowed to have all required functions, that is, a main function and other functions (for example, orange light-cutting and color adjustment) and, when the near infrared-cutting material is produced in many kinds and each in a small amount, a transparent resin adhesive layer is formed on a transparent resin film, with the transparent resin film being allowed to have only a main function and the transparent resin adhesive layer being allowed to have other functions. However, for example, when the upper limit of the dye content in the transparent resin film is low, it is possible to as necessary use, for example, a dye having a maximum absorption wavelength at an orange light region, in both the transparent resin film and the transparent resin adhesive layer at appropriate proportions.

The solvent used in the transparent resin solution of the present invention has no particular restriction as to the kind, boiling point, etc. as long as it can dissolve the resin used in the solution and can uniformly disperse or dissolve the additives (e.g. dyes) used. As the solvent, there can be mentioned, for example, tetrahydrofuran (THF), diethyl ether, 1,4-dioxane, 1,3-dioxolane, chloroform, dichloromethane (methylene chloride), ethyl acetate, methyl acetate, butyl acetate, methanol, ethanol, isopropyl alcohol, dimethylformamide (DMF), dimethyl sulfoxide (DMSO), N-methylpyrrolidone (NMP), acetone and methyl ethyl ketone. These solvents can be used singly or in admixture of two or more kinds.

In the present invention, first, a transparent resin solution for transparent resin film or transparent adhesive layer is produced using the above-mentioned components. There is no particular restriction as to the method and conditions employed in production of the transparent resin solution. However, ordinarily, (1) a resin, dyes and a solvent are mixed, (2) a resin solution and dyes are mixed, (3) a resin and a dye solution (or a dye dispersion) are mixed, or (4) a resin solution and a dye solution (or a dye dispersion) are mixed to obtain a uniform solution or dispersion. One of the above mixing methods is appropriately selected in view of the dye and resin concentrations and the operational efficiency. Mixing is conducted ordinarily at room temperature until a uniform solution (or a uniform dispersion) is obtained; however, mixing may be conducted with heating as long as the dyes are not decomposed.

In the transparent resin solution, there is no particular restriction as to the dye and resin concentrations as long as a uniform solution (or a uniform dispersion) is obtained.

Then, the transparent resin solution obtained above is coated on a transparent substrate and dried to form a transparent resin film or a transparent adhesive layer. This coating is conducted by an ordinary coating method such as dip coating, spin coating, die coating, bar coating, roll coating, spray coating or the like.

Then, the coated substrate is subjected to drying at atmospheric pressure (first stage drying) until the residual solvent amount becomes 3% by weight or less, and subsequently to drying under reduced pressure (second stage drying) until the residual solvent amount becomes 5 ppm by weight to less than 500 ppm by weight.

There is no particular restriction as to the temperature, time, etc. employed during the drying at atmospheric pressure (first stage drying), as long as the dyes used are not decomposed. Meanwhile, the pressure employed during the drying under reduced pressure (second stage drying) can be, for example, $10^{-5}$ to $10^4$ Pa, preferably $10^{-4}$ to $10^3$ Pa. When the pressure is less than $10^{-5}$ Pa, a large apparatus is required, incurring a high cost. When the pressure is more than $10^4$ Pa, it is not easy to achieve a residual solvent amount of less than 500 ppm by weight. Therefore, such pressures are not preferred.

The temperature employed in the drying under reduced pressure (second stage drying) is desirably lower than the temperature employed during the drying at atmospheric pressure, by, for example, 5 to 150° C., preferably 10 to 100° C., because if the second stage drying is conducted at a high temperature or for a long time, the added dyes may be decomposed as in the conventional drying wherein atmospheric pressure is used even in the second stage. When the temperature of the second stage drying is lower by less than 5° C., the drying time of the second stage drying is shorter than in the conventional drying and the added dyes are less likely to decompose but there is still a fear of decomposition. When the temperature of the second stage drying is lower by more than 150° C., it is not easy to achieve a residual solvent amount of less than 500 ppm by weight even if a vacuum of $10^{-5}$ Pa has been employed.

As to the dye content in the transparent resin film or the transparent adhesive layer both formed by drying, there is no particular restriction as long as the dye is uniformly dissolved or dispersed in the transparent resin film or the transparent adhesive layer and shows sufficient visible light transmittability, sufficient near infrared-cutting property, sufficient orange light-cutting property, etc. Since the dye content can be lower as the transparent resin film or the transparent adhesive layer has a larger thickness, the dye content is ordinarily determined appropriately in view of the thickness of the film or the layer.

As to the thickness of the transparent resin film or the transparent adhesive layer, there is no particular restriction. However, the thickness is appropriately determined in view of the dye content, the properties of the resin solution, the defects (e.g. cissing and orange peel surface) of the resin film, the warpage of the film-formed product (e.g. film or sheet), etc. The thickness is, for example, 1 to 100 μm, preferably 2 to 50 μm, more preferably 5 to 25 μm. When the thickness is less than 1 μm, cissing appears easily; when the thickness is 100 μm, defects such as orange peel surface and the like appear easily.

The amount of the solvent remaining (i.e. residual solvent amount) in the transparent resin film or the transparent adhesive layer is required to be 5 ppm by weight to less than 500 ppm by weight, preferably 10 ppm by weight to less than 500 ppm by weight. When the residual solvent amount is less than 5 ppm by weight, the stability of the dyes in the transparent resin film or the transparent adhesive layer is substantially the same as in the prior art and yet a higher processing cost is required. When the residual solvent amount is more than 500 ppm by weight (0.05% by weight), the stability, particularly long-term stability of the dyes in the transparent resin film or the transparent adhesive layer is not sufficient.

The residual solvent amount in the transparent resin film or the transparent adhesive layer is measured as follows. That is, the residual solvent amount A (ppm) in an accurately weighed sample (a planar base material and a planar film) of any desired weight is quantitatively determined by gas chromatography; then, the film weight C (g) in B (g) of a sample (a planar base material and a planar film) of any desired area is calculated from the weights before and after the removal of the film by wiping with a solvent; lastly, the residual solvent amount (ppm) in the film is calculated from the following formula.

Residual solvent amount in film (ppm)=$A \cdot B/C$

Incidentally, "any desired area" is an area which enables accurate and safe calculation of film weight, and can be smaller as the film thickness is larger. There is no particular restriction as to the shape of "planar", and the shape is ordinarily square, rectangular, circular or the like in view of the cutting easiness.

The present invention is described in more detail below by way of Examples.

EXAMPLE 1

In 100 parts by weight of 1,3-dioxolane were dissolved, as near infrared-absorbing dyes, 0.07 part by weight of a dithiol-nickel complex represented by the above-mentioned formula (1), 0.2 part by weight of a diimonium compound represented by the following formula (2')

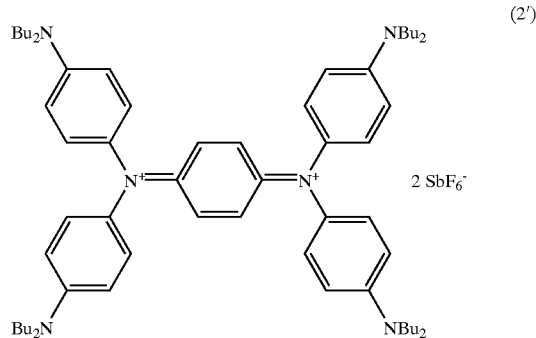

and 0.2 part by weight of a dithiol-nickel complex represented by the following formula (3')

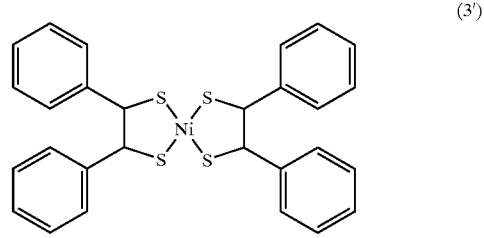

and, as a dye having a maximum absorption wavelength at an orange light region, 0.008 part by weight of a cyanine compound represented by the above-mentioned formula (4), to prepare a dye solution. Thereto was added 18 parts by weight of a polycarbonate, followed by mixing to prepare a coating solution.

This coating solution was coated on a polyester film (as a transparent substrate) using a bar coater having a clearance of 100 μm. Then, first stage drying was conducted at 80° C. at atmospheric pressure for 5 minutes, after which second stage drying was conducted at 50° C. under reduced pressure ($1.0 \times 10^{-3}$ Pa) for 25 minutes to form a resin film, whereby a film-shaped near infrared-cutting material was produced. The residual solvent amount in the resin film was 2.5% by weight after the first stage drying and 100 ppm by weight (0.01% by weight) after the second stage drying.

This film-shaped near infrared-cutting material was good in initial properties (e.g. initial near infrared-cutting property) and was very good in long-term stability. Specifically, the light-separating property (e.g. near infrared-cutting property) of the material remained unchanged after a long-term heat resistance test (80° C.×1,000 hours).

Comparative Example 1

A coating solution having the same composition as in Example 1 was coated under the same conditions as in Example 1. Then, drying was conducted at 80° C. at atmospheric pressure for 30 minutes to produce a film-shaped near infrared-cutting material. The residual solvent amount in the resin film was 0.1% by weight. This film-shaped near infrared-cutting material was good in initial properties (e.g. initial near infrared-cutting property) as in Example 1, but was not sufficient in long-term stability. Specifically, the light-separating property (e.g. near infrared-cutting property) of the resin film decreased slightly and the material was usable after a mid-term heat resistance test (80° C.×500 hours), but decreased significantly after a long-term heat resistance test (80° C.×1,000 hours) and the material was unusable.

Comparative Example 2

A coating solution having the same composition as in Example 1 was coated under the same conditions as in Example 1. Then, drying was conducted at 100° C. at atmospheric pressure for 30 minutes to produce a film-shaped near infrared-cutting material. The residual solvent amount in the resin film was 0.07% by weight. This film-shaped near infrared-cutting material showed dye decomposition during the drying and, as a result, the initial properties (e.g. initial near infrared-cutting property) per se were far inferior to those of Example 1 and Comparative Example 1, making it unnecessary to conduct a long-term heat resistance test.

EXAMPLE 2

A coating solution was prepared in the same manner as in Example 1 except that the 1,3-dioxolane was replaced by dichloromethane and the polycarbonate was replaced by a polyarylate. Using this coating solution, coating and drying were conducted in the same manner as in Example 1, to produce a film-shaped near infrared-cutting material. The residual solvent amount in the resin film was 2.0% by weight after the first stage drying and 50 ppm by weight after the second stage drying.

This film-shaped near infrared-cutting material was good in initial properties (e.g. initial near infrared-cutting property) and was very good in long-term stability, similarly to the material of Example 1. Specifically, the light-separating property (e.g. near infrared-cutting property) of the resin film remained unchanged after a long-term heat resistance test (80° C.×1,000 hours).

EXAMPLE 3

A coating solution was prepared in the same manner as in Example 2 except that the polyarylate was replaced by a polymethyl methacrylate. Using this coating solution, coating and drying were conducted in the same manner as in Example 1 and Example 2, to produce a film-shaped near infrared-cutting material. The residual solvent amount in the resin film was 2.0% by weight after the first stage drying and 50 ppm by weight after the second stage drying.

This film-shaped near infrared-cutting material was good in initial properties (e.g. initial near infrared-cutting property) and was very good in long-term stability, similarly to the materials of Example 1 and Example 2. Specifically, the light-separating property (e.g. near infrared-cutting property) of the resin film remained unchanged after a long-term heat resistance test (80° C.×1,000 hours).

Comparative Example 3

A coating solution having the same composition as in Example 3 was coated under the same conditions as in Example 3. Then, drying was conducted at 80° C. at atmospheric pressure for 30 minutes to produce a film-shaped near infrared-cutting material. The residual solvent amount in the resin film was 0.09% by weight. This film-shaped near infrared-cutting material was good in initial properties (e.g. initial near infrared-cutting property) as in Example 3, but was low in stability. Specifically, the light-separating property (e.g. near infrared-cutting property) of the resin film decreased significantly after a mid-term heat resistance test (80° C.×500 hours) and the material was unusable.

As appreciated from the above, when the residual solvent amount in the transparent resin film, etc. each containing a near infrared-absorbing dye, etc. was controlled at a minimum level, specifically at 10 ppm by weight to less than 500 ppm by weight, the long-term stability of the near infrared-absorbing dye, etc. in the transparent resin film, etc. at high temperatures was improved significantly. For example, the light-separating property (e.g. near infrared-cutting property) of the transparent resin film, etc. did not change even after a long-term heat resistance test (80° C.×1,000 hours).

Meanwhile, when the residual solvent amount in the transparent resin film exceeded the above range, the light-separating property of the film decreased gradually. Although the decrease was within an allowable range after 500 hours, the decrease exceeded the allowable range after 1,000 hours, making the film unusable as a front filter. After 1,000 hours, the film showed a striking change also in the hue.

Further, when the residual solvent amount in the transparent resin film, etc. is controlled as above, it is possible to use dyes which have heretofore been unusable owing to the inferior long-term stability; a dye/resin combination, etc. can be selected from a wider range; as a result, designing of a near infrared-cutting material of intended light separability can be made in a far higher freedom. This is advantageous in providing near infrared-cutting materials of a variety of kinds.

Further, when vacuum drying (second stage drying) is conducted after atmospheric pressure drying (first stage drying), it is possible to use a high-boiling solvent which has been unusable owing to the high-boiling point in the conventional drying (which uses atmospheric pressure in both of the first and second stage dryings); and a dye/resin/solvent combination for transparent resin solution can be selected from a much wider range. Use of a high-boiling solvent makes easy (1) the concentration and viscosity control of transparent resin soluiton and resultantly (2) the control of the coating conditions of the solution and the control of the thickness of the film formed with the solution.

The time from preparation to completion of coating, allowed for a transparent resin solution has heretofore been short in some cases owing to the limited pot life of the solution. In the present invention, however, since a dye/resin/solvent combination can be selected from a much wider range, it is possible to prepare a transparent resin solution having a very long pot life. As a result, there is no case that a transparent resin solution becomes unusable owing to the expiration of the pot life; it is possible to prepare a transparent resin solution in a large amount at one time and store it; thus, the utilization and operational (preparation and coating) efficiency of transparent resin solution are improved strikingly.

Owing to the short pot life of coating solution, there have heretofore been cases that the length of coating and the site where the coating solution is prepared, are restricted. In the present invention, however, there is no such restriction, which is very advantageous in achieving a large cost reduction.

What is claimed is:

1. A near infrared-cutting material produced by forming, on a transparent substrate, a transparent resin film containing at least a near infrared absorbing-dye and a dye having a maximum absorption wavelength at 550 to 620 nm, wherein the amount of the solvent remaining in the transparent resin film is 5 ppm by weight to less than 500 ppm by weight.

2. A near infrared-cutting material produced by forming, on a transparent substrate, a transparent resin film containing at least a near infrared absorbing-dye and a transparent resin adhesive layer containing at least a dye having a maximum absorption wavelength at 550 to 620 nm so that the transparent resin adhesive layer becomes the outermost layer, wherein the amount of the solvent remaining in the transparent resin film and/or the transparent resin adhesive layer is 5 ppm by weight to less than 500 ppm by weight.

3. A near infrared-cutting material according to claim 1, wherein the resin for the transparent resin film is a polycarbonate and/or a polyarylate.

4. A near infrared-cutting material according to claim 1, wherein the near infrared-absorbing dye is a dithiolmetal complex compound and/or a diimonium compound.

5. A near infrared-cutting material according to claim 1, wherein the dye having a maximum absorption wavelength at 550 to 620 nm is a cyanide compound.

6. A process for producing a near infrared-cutting material, which comprises coating, on a transparent substrate, a transparent resin solution containing at least a near infrared absorbing-dye and a dye having a maximum absorption wavelength at 550 to 620 nm, drying the resulting material at atmospheric pressure until the amount of the solvent remaining in the formed resin film becomes 3% by weight or less, and then drying the resulting material under reduced pressure until the amount of the solvent in the film becomes 5 ppm by weight to less than 500 ppm by weight.

7. A process for producing a near infrared-cutting material according to claim 6, wherein the pressure employed during the drying under reduced pressure is $10^{-5}$ to $10^4$ Pa and the temperature employed during the drying under reduced pressure is 5 to 150° C. lower than the temperature employed during the drying at atmospheric pressure.

8. A near infrared-cutting material according to claim 2, wherein the resin for the transparent resin film is a polycarbonate and/or a polyarylate.

9. A near infrared-cutting material according to claim 2, wherein the near infrared-absorbing dye is a dithiolmetal complex compound and/or a diimonium compound.

10. A near infrared-cutting material according to claim 2, wherein the dye having a maximum absorption wavelength at 550 to 620 nm is a cyanide compound.

* * * * *